United States Patent

[11] 3,609,703

[72] Inventor Antony Peacock
Poughkeepsie, N.Y.
[21] Appl. No. 837,636
[22] Filed June 30, 1969
[45] Patented Sept. 28, 1971
[73] Assignee International Business Machines Corporation
Armonk, N.Y.

[54] COMPARISON MATRIX
5 Claims, 3 Drawing Figs.

[52] U.S. Cl. .......... 340/172.5
[51] Int. Cl. .......... G06f 7/22
[50] Field of Search .......... 340/172.5, 146.2, 166; 235/177

[56] References Cited
UNITED STATES PATENTS

| | | | |
|---|---|---|---|
| 3,204,221 | 8/1965 | Sierra | 235/177 |
| 3,222,695 | 12/1965 | Davis | 235/177 |
| 3,251,035 | 5/1966 | Weinstein | 235/177 |
| 3,371,320 | 2/1968 | Lachenmayer | 340/172.5 |
| 3,445,821 | 5/1969 | Rudolph et al. | 340/172.5 |
| 3,451,045 | 6/1969 | Bartlett et al. | 340/172.5 |
| 3,478,314 | 11/1969 | Wedmore | 340/146.2 |

*Primary Examiner*—Paul J. Henon
*Assistant Examiner*—Mark Edward Nusbaum
*Attorneys*—Hanifin and Jancin and William S. Robertson

ABSTRACT: A new comparison circuit is adapted to be connected in a row and column array for comparing words applied to the columns of the array with a sequence of words applied to the rows. Each comparison circuit has means for registering a match or a mismatch while corresponding bit positions of the words that are being compared are applied to the column input and the row input of the circuit. A comparison circuit includes means responsive to a match to transmit data from a row input to a column output.

The specification describes the circuit as it is arranged to compare key words to a file index with key words supplied by a user of the file and to transmit a data word called a pointer to the user to identify the file location when a match is found.

INVENTOR
ANTONY PEACOCK

BY W. S. Robertson

ATTORNEY

COMPARISON MATRIX

INTRODUCTION

The circuit of this invention is particularly useful in searching through an index to find particular entries in a large file. Such an entry could be a program or data that is to be handled according to a program. Two or more related entries such as data and a particular program to operate on the data may also be searched. The index contains key words ("keys") that identify the entries in the file. The index also contains "-pointers" that have the information necessary to access the file at the location of an associated key. The person or program using the file supplies keys to circuits associated with the file, and these circuits locate the related file entries and supply the entries to the user. The terms "index key" and "search key" will distinguish the two kinds of keys.

An index is usually large and a search through an index requires a significantly long time. It is difficult to shorten the search beyond the time required to compare every entry in the index. For example, the prior art has taught sorting the index keys and the search keys so that a search key can be compared with only the relevant portion of the index. An object of this invention is to provide a new and improved matrix of comparison circuits for making several independent searches simultaneously and to avoid sorting either the index or the search keys.

SUMMARY OF THE INVENTION

A matrix of the comparison circuits of this invention is advantageously arranged to compare search keys that are applied to column (arbitrarily) inputs of the matrix with a sequence of index keys that are read from the index and applied to row inputs of the comparison matrix. Preferably a key is a group of binary digits and the digits of each key are presented serially to the inputs of the comparison matrix. For example, the index may be a magnetic drum memory storing keys sequentially along certain tracks. A shift register or functionally similar device is provided for storing the search keys and presenting the search keys serially by bit at the column inputs of the matrix.

Each comparison matrix includes a circuit for comparing a bit on the associated column input with a bit on the associated row input and for producing a signal when a mismatch occurs. A mismatch for any bit position signifies a mismatch for the associated key. The circuit includes a latch that is arranged to be set at the beginning of the search on a key and to be reset when a mismatch occurs. A 1 output (arbitrarily) of the latch signifies that a match has occurred at each bit position and a 0 output signifies that a mismatch has occurred at one or more positions.

Gates are provided in each comparison circuit for transferring a pointer from a second row input to a column output when the latch remains reset at the end of a search on an index key. Preferably, the pointers are stored in the index to follow the associated index key on an adjacent track of the index.

A second latch may be provided for each comparison circuit so that the first latch can compare the next index key while the second latch controls transmitting the pointer of the preceding key to the column output. Means is also provided in each comparison circuit for transmitting and receiving control signals.

A parallel search embodiment of the invention is also disclosed.

From a more general standpoint the comparison matrix is useful for transferring data between its row and column inputs in response to a match between words applied to row and column inputs. Other applications for the invention and objects and features of the invention will be apparent from the detailed description of the circuit of the drawing.

THE DRAWING

THE EMBODIMENT OF THE DRAWING

Figure 1:
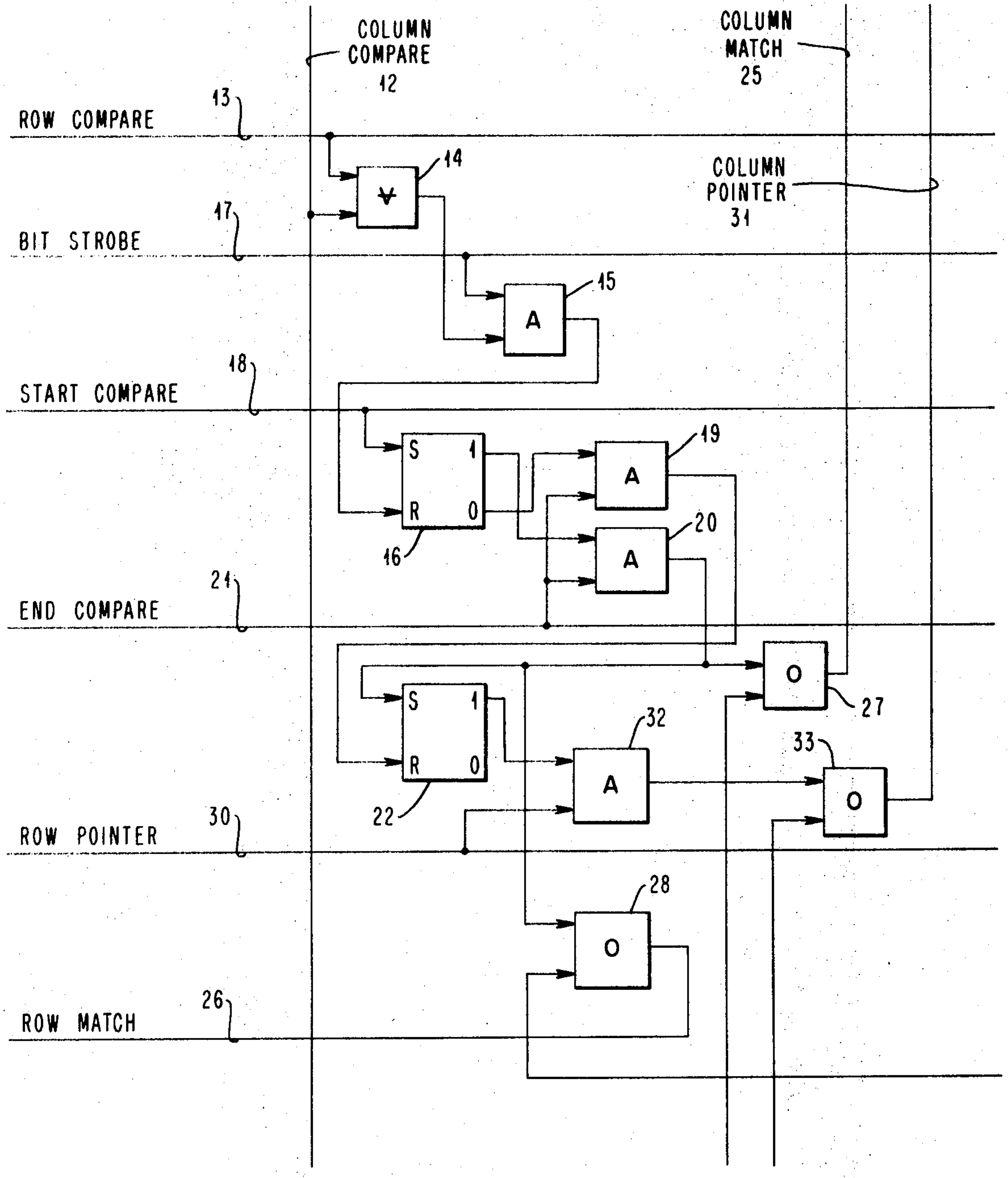
FIG. 1 shows the preferred comparison circuit of this invention.

The Circuit Of FIG. 1

FIG. 1 shows the compare circuit of this invention with the inputs and outputs that interconnect a matrix of these circuits with peripheral circuits. The interconnections extend to the left in the drawing to an index (not shown in FIG. 1) and extend upward to circuits (not shown) that hold keys and data for a user of the index. Timing lines are shown arranged in rows (arbitrarily since each circuit receives the same timing signals) with legends along the left side of the drawing.

Figure 2:
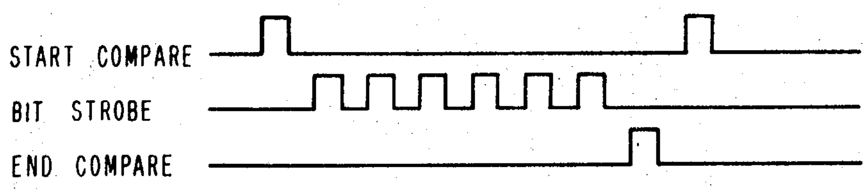
FIG. 2 shows a timing sequence for operating the circuit of FIG. 1.

The circuit receives a search key on a column compare line 12 and it receives an index key on a row compare line 13. A circuit 14 has inputs connected to lines 12, 13 to produce at its output the Exclusive OR logic function of a bit on line 12 and a bit on line 13. A 1 at the output of circuit 14 signifies a mismatch and a 0 signifies a match. An AND logic circuit 15 responds to a bit strobe signal on line 17 to produce at its output a 1 signifying a mismatch or a 0 signifying a match only at times when the output of circuit 14 represents a comparison. The bit strobe signal is shown in FIG. 2. A latch 16 has its reset input connected to the output of circuit 15 to be reset whenever a mismatch occurs during the serial comparison of keys on lines 12 and 13. A line 18, Start Compare, is connected to the set input of latch 16 to set the latch to its match signifying state to begin a key comparison operation. FIG. 2 shows the start compare timing.

The circuit components which have been described so far detect a mismatch at any bit position of the two keys being compared in a comparison operation. In a subsequent operation this information is used to control the transfer of a pointer from the index to the user. Preferably, the components just described go on to another compare operation while the pointer transfer takes place. So that the two operations can take place at the same time, two AND circuits 19 and 20 and an End Compare Timing line 21 are arranged to transfer the contents of latch 16 to a second latch 22. FIG. 2 shows the end compare timing signal. After the end compare signal is applied to line 21, latch 22 is given the same state as latch 16. A start compare signal is then applied to line 18 to set latch 16 to begin a compare operation, as has already been described.

Preferably a column match line 25 and a row match line 26 are arranged to signal the peripheral row and column circuits when a match occurs. An OR circuit 27 combines the output of AND circuit 20 (signifying a match) with the portion of the column match signal from the compare circuit of the next lower row of the same column. An OR circuit 28 similarly combines the output of AND circuit 20 with the output of column positions to the left for the same row.

After a match is found and the match signals have been applied to lines 25 and 26 as already explained, a pointer transfer operation occurs from a row pointer line 30, to a column pointer line 31. An AND circuit 32 is connected to establish an interconnection between lines 30 and 31 in response to the set state of latch 22. An OR circuit 33 couples the output and AND circuit 32 to the column pointer line 31.

Figure 3:
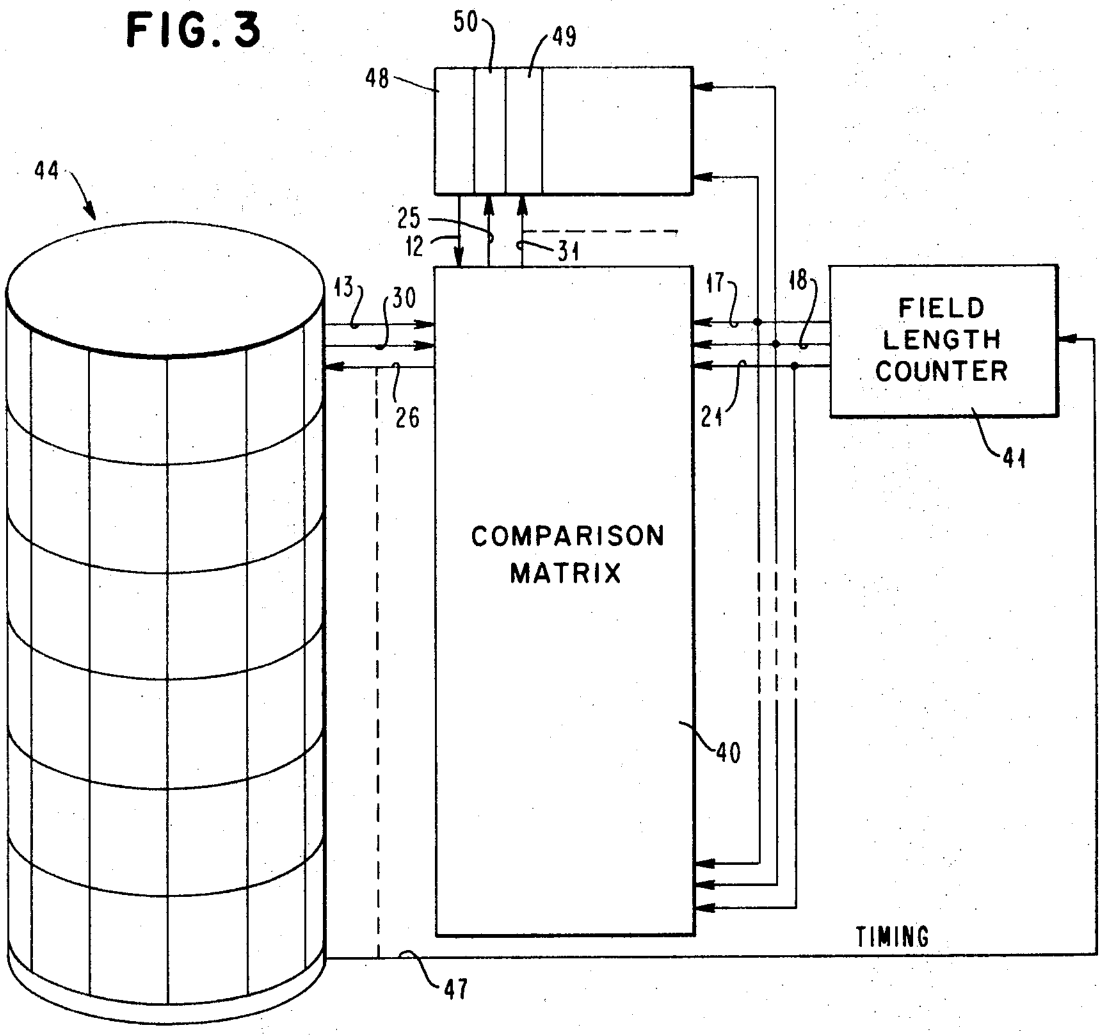
FIG. 3 shows a matrix comparator using the circuits of FIG. 1 for searching an index.

The System of FIG. 3

FIG. 3 shows a comparison matrix 40 made up of the circuits of FIG. 1. The circuits of the matrix have the same orientation in FIG. 3 as in FIG. 1 and the group of three row lines 13, 30, 26 indicate a row of the comparison matrix, and the group of column lines 12, 25, 31 indicate a column of the matrix. Other groups of row and column lines are indicated in the drawing by dashed lines. A field length counter 41 which will be described later supplies the timing signals 17, 18, 21. (The connections of lines 17, 18, 21 to each row show that the same timing signals are applied throughout the matrix in contrast to the arrangement of keys 12, 13 which are individual to each row or column; various equivalent connections will be apparent).

The row lines 13, 30, 26 are connected to an index memory shown schematically as a drum 44. The drum and its associated circuits are well known and the schematic of FIG. 2 is arranged to show how data is organized on the drum. Each block on the drum represents a portion of a track storing one index key and a portion of another track storing the pointer for the preceding block. (A third track associated with line 26 will be described later). Thus, a key and the associated pointer appear sequentially at the outputs 13, 30 as two successive blocks are read from the drum (along with the one key and one pointer from the two adjacent blocks). From a more general standpoint, index memory 44 has a plurality of parallel data outputs and is arranged to provide words serially at each output. Means is provided responsive to line 26 to provide words only selectively at output 30. Tansistor shift registers and other functionally equivalent storage devices are well known.

The row match line 26 provides information that is useful for operating the index. An example, a third track can be provided for recording the frequency of access of the corresponding key. Frequently used keys can be located at several places on the drum to permit access in less than a full revolution of the drum. Signal line 26 can similarly be connected to appropriate monitoring and control circuits independent of the drum.

Drum 44 also supplies timing signals on a line 47 to the field length counter 41. The signals on line 47 are thus synchronized with the bits that appear on either row lines 13 or 30. (Equivalently, a clock provides signals to advance the index memory 44 and to synchronously control the field length counter). The field length counter supplies the signals of FIG. 2. It includes a conventional counter that is advanced by the timing signals 47, and it includes circuits that decode the counter output to produce the appropriate signals on lines 17, 18 and 21. Thus, for the example of FIG. 2 in which there are eight pulse intervals in a compare sequence, the counter would count from 0 through 7 and reset. In response to the 0 count state of the counter, the decoder would transmit one pulse to the start compare line 18, the next six pulses to the bit strobe line 17, and the last pulse to the end compare line 21. Preferably the field length counter is adjustable to permit adjusting the operation of the comparison matrix to keys and pointers of various length. Suitable counters and counter decoding circuits are well known.

The column lines 13, 25, 31 are connected to a set of registers that collectively form a transactions register 45. Each line 12 is connected to the output of a shift register 48 that stores a key supplied by the user. Shift register 48 is advanced by the bit strobe signal 17 so that corresponding bit positions of the two keys appear on the two compare lines 12 and 13. The shift register is connected to be reset to a starting position by the start compare timing signal 18 (or by the end compare timing signal 21).

Each column pointer line 31 is connected to a shift register 49 that stores a pointer transmitted from index memory 44 on column line 30. Shift register 49 is advanced with the bit strobe 17. A logic circuit 50 for each shift register 49 is provided for signaling a user that a match has been found. In many applications, a key is stores only once in the index. When a match is found, the search can be ended and a new search can be started. Circuit 50 may comprise a latch connected to be set in response to a match signal on line 25 and to be reset as the key and pointer are read from the register and a new key is entered. In such an application a second match during a search signifies that the index has been incorrectly organized and that it may be desirable to reorganize the index. Circuit 50 may further comprise a pair of latches conventionally arranged to count the signals on line 25 and to produce a signal signifying a second match. The counter is also connected to be reset to begin a new search after its output has been sensed.

SUMMARY OF OPERATION

Before the comparison matrix is used, the data that is to be searched is assigned identifying keys and is stored in a suitable large memory (not shown). The keys are stored in the index register, and addresses of the large memory are stored as pointers in the index.

The index memory can be changed as entries are changed in the large memory; for example, as information on the match lines indicates that certain high usage keys should be located at several places in the index.

A user determines the keys that he wants to search and enters them in the transactions register. As matches occur, the pointers are supplied to the user. Conventional circuits not shown in the drawing fetch the corresponding entries in the large memory or otherwise operate on the pointers.

While the invention has been particularly shown and described with reference to preferred embodiments thereof, it would be understood by those skilled in the art that the foregoing and other changes in form and detail may be made therein without departing from the spirit and scope of the invention.

What is claimed is:

1. Search apparatus comprising:

an index memory for providing a sequence of search keys at a plurality of outputs followed by pointers each identifying an associated search key;

a transactions register for receiving search keys representing a plurality of search requests;

timing means for applying the search keys in synchronism with the index keys;

a matrix of comparison circuits connected to receive the search keys along column lines and index keys and pointers along row lines, each comparison circuit comprising:

an Exclusive OR circuit connected at the intersection of a column key line and a row key line to produce a mismatch signifying signal;

latch means connected to be reset to begin a search and to be set in response to a mismatch signal from said Exclusive OR circuit; and a logic gate connected to be responsive to the associated latch means to transmit a pointer from the corresponding row line to the transactions register stage of the corresponding column.

2. The search apparatus of claim 1 in which said matrix includes separate row lines for key and pointer signals.

3. The search apparatus of claim 2 in which said latch means comprises a first latch connected to be set according to a mismatch signal, a second latch connected to control said logic gate to transmit a pointer, and a second logic gate connected to transfer the contents of said first latch to said second latch at the end of matching key comparison, and said apparatus further includes timing means for operating said Exclusive OR circuit and first latch to compare subsequent keys during transfer of a pointer through said logic gate controlled by said second latch.

4. The search apparatus of claim 3 including a match line for each row and each column and including third logic gate means connecting each comparison circuit to produce a signal on its row and column match lines in response to a match condition at the end of a search.

5. The search apparatus of claim 1 in which said timing means includes an adjustable counter arranged to produce a selected number of pulses gating bits of keys from said transactions register between pulses controlling the operations between key comparisons.